US008532715B2

(12) United States Patent
Zheng et al.

(10) Patent No.: US 8,532,715 B2
(45) Date of Patent: Sep. 10, 2013

(54) METHOD FOR GENERATING AUDIBLE LOCATION ALARM FROM EAR LEVEL DEVICE

(75) Inventors: Judy Jiehua Zheng, San Francisco, CA (US); Meena Ramani, Cupertino, CA (US)

(73) Assignee: Sound ID, Redwood City, CA (US)

( * ) Notice: Subject to any disclaimer, the term of this patent is extended or adjusted under 35 U.S.C. 154(b) by 500 days.

(21) Appl. No.: 12/786,707

(22) Filed: May 25, 2010

(65) Prior Publication Data

US 2011/0294541 A1 Dec. 1, 2011

(51) Int. Cl.
*H04M 1/00* (2006.01)

(52) U.S. Cl.
USPC ....... 455/569.1; 455/41.2; 455/90.1; 455/566

(58) Field of Classification Search
USPC .............. 455/569.1, 575.1, 575.2, 90.1, 90.2, 455/90.3; 381/311, 322, 324, 328, 330
See application file for complete search history.

(56) References Cited

U.S. PATENT DOCUMENTS

| | | | |
|---|---|---|---|
| 6,212,496 | B1 | 4/2001 | Campbell et al. |
| 7,328,151 | B2 | 2/2008 | Muesch |
| 2004/0136555 | A1 | 7/2004 | Enzmann |
| 2005/0130593 | A1 | 6/2005 | Michalak |
| 2005/0248717 | A1 | 11/2005 | Howell et al. |
| 2008/0137873 | A1 | 6/2008 | Goldstein |
| 2008/0165980 | A1 | 7/2008 | Pavlovic et al. |
| 2009/0180631 | A1 | 7/2009 | Michael et al. |
| 2010/0027824 | A1 | 2/2010 | Atamaniuk et al. |
| 2010/0159833 | A1 * | 6/2010 | Lewis et al. .................. 455/41.3 |
| 2012/0169486 | A1 * | 7/2012 | Sweeney et al. ........... 340/384.1 |

FOREIGN PATENT DOCUMENTS

| | | | |
|---|---|---|---|
| DE | 10222408 | A1 | 11/2003 |
| WO | 0124576 | A1 | 4/2001 |
| WO | 2006105105 | A2 | 10/2006 |

OTHER PUBLICATIONS

Sound ID Bluetooth Headset and EarPrint iPhone App—Available Jun. 6, but We Already Have a Review. Gear Diary. May 24, 2010 [retrieved on Sep. 15, 2011. Retrieved from the internet: <URL: http://www.geardiary.com/201 0/05/24/Sound-Id-annouces-sound-id-51 O-bluetooth-headset-and-earprint-iphone-app-available-June-6-but-we-already-have-a-review/>.

Sound ID 510 Bluetooth Headset Review. YouTube. May 23, 2010 [retrieved on Sep. 16, 2011). Retreived from the internet <URL: http://www.youtube.com/watch?v=tVrC_MooGWO>.

International Search Report and Written Opinion for corresponding International application No. PCT/US2011/037962; mailed Sep. 28, 2011; 12 pages.

Lippmann, R. P. et al., Study of multichannel amplitude compression and linear amplification for persons with sensorineural hearing loss, J. Acoust. Soc. Am. 69(2), Feb. 1981, pp. 524-534.

* cited by examiner

*Primary Examiner* — Temica M Beamer
(74) *Attorney, Agent, or Firm* — James F. Hann; Haynes Beffel & Wolfeld LLP

(57) ABSTRACT

An audible location alarm is generated from an ear-level device of a type comprising a memory, a microphone and a speaker, each coupled to a processor. Communication is established between the ear-level device and a companion device, the companion device having an interface, a display associated with the user interface, and an audible location alarm program stored therein. The audible location alarm program is initiated. An audible location alarm signal is transmitted to the ear-level device, thereby providing instruction to the ear-level device to broadcast an audible location alarm through the speaker of the ear level device until detection of an end event.

18 Claims, 9 Drawing Sheets

METHOD FOR GENERATING AUDIBLE LOCATION ALARM FROM EAR LEVEL DEVICE

BACKGROUND OF THE INVENTION

The present invention relates to personalized sound systems, including an ear-level device adapted to be worn on the ear, and a method for locating the ear level device using a companion device.

Ear-level devices, including headphones, earphones, head sets, hearing aids and the like, are adapted to be worn at the ear of a user and provide personal sound processing. U.S. patent application Ser. No. 11/569,449, entitled Personal Sound System Including Multi-Mode Ear-level Module with Priority Logic, published as U.S. Patent Application Publication No. US-2007-0255435-A1 is incorporated by reference as if fully set forth herein. In US-2007-0255435-A1, a multi-mode ear-level device is described in which configuration of the ear-level device and call processing functions for a companion mobile phone are described in detail. Hearing profiles are discussed in co-pending U.S. patent application Ser. No. 12/778,930, entitled Personalized Hearing Profile Generation with Real-Time Feedback, filed on 12 May 2010.

A common problem with small, relatively expensive electronic devices is that they are easy to misplace and once misplaced, difficult to find.

SUMMARY OF THE INVENTION

The invention is directed to a method for generating an audible location alarm from an ear-level device of a type comprising a memory, a microphone and a speaker, each coupled to a processor. The method is carried out as follows. Communication is established between the ear-level device and a companion device, the companion device having an interface, a display associated with the user interface, and an audible location alarm program stored in the companion device. The audible location alarm program is initiated. An audible location alarm signal is transmitted to the ear-level device, thereby providing instruction to the ear-level device to broadcast an audible location alarm through the speaker of the ear level device until detection of an end event.

In some examples the audible location alarm signal transmitting step is an increasing volume audible location alarm transmitting step, so that the audible location alarm broadcast by the ear-level device increases in volume over time, while in other examples the audible location alarm signal transmitting step is a constant volume audible location alarm transmitting step, so that the volume of the audible location alarm broadcast by the ear-level device remains generally constant over time.

In some examples the communication establishing step is carried out with a mobile phone as the companion device.

In some examples a loud noise warning is displayed on the display and the user chooses to proceed with or cancel the audio location alarm.

During conventional use, ear level devices do not need to produce very loud sounds. One aspect of the present invention is the recognition (1) that an ear level device may be capable of producing a sound much louder than produced when worn by a user, and (2) such an enhanced loudness sound can be loud enough to serve as an audible location alarm.

Other aspects and advantages of the present invention can be seen on review of the drawings, the detailed description, and the claims which follow.

DETAILED DESCRIPTION

Figure 1:
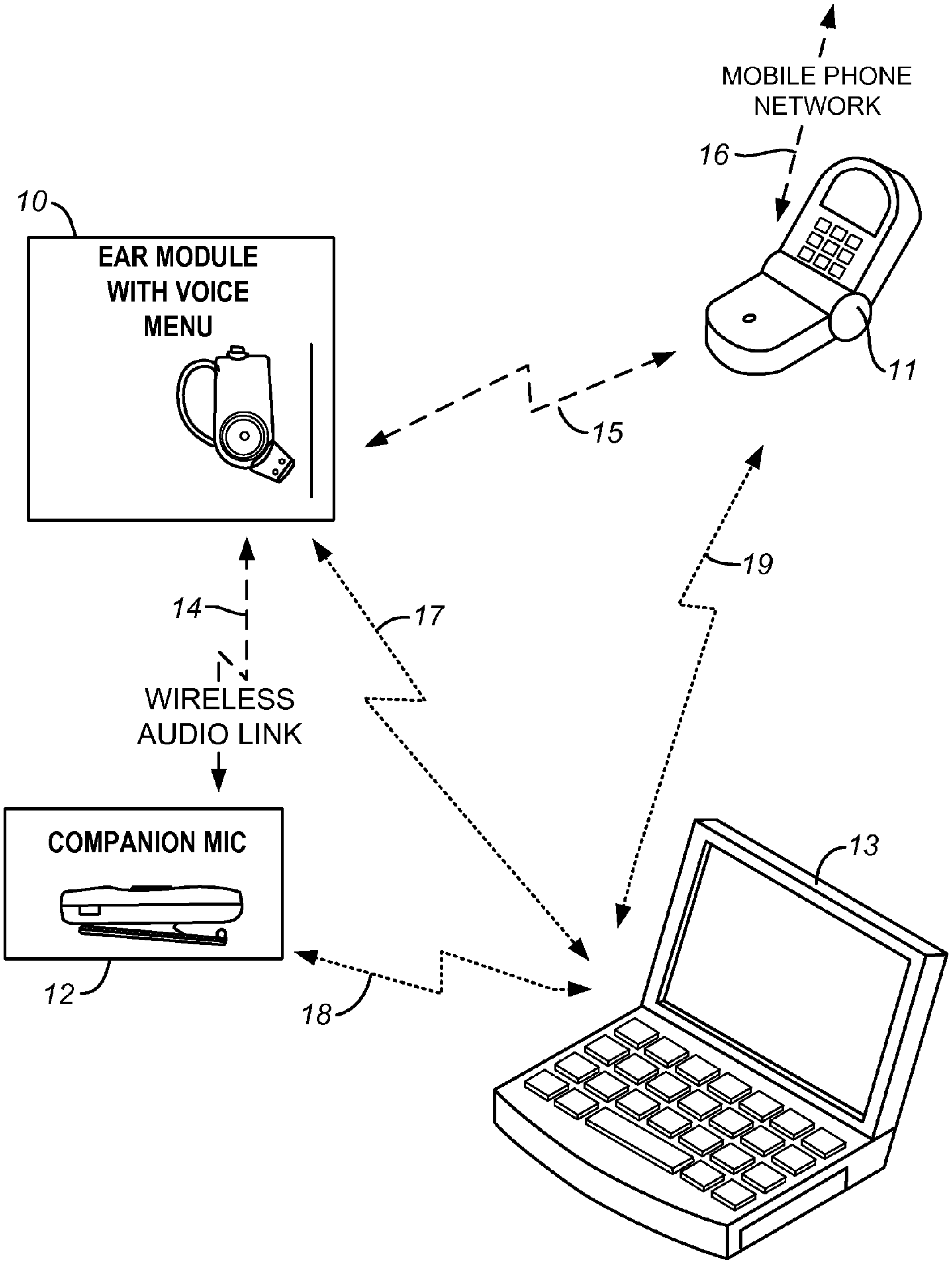
FIG. 1 is a simplified diagram of a wireless network including an ear-level device supporting a voice menu as described herein, along with companion devices which can communicate with the ear-level device.

FIG. 1 illustrates a wireless network including an ear module 10, adapted to be worn at ear-level, and a mobile phone 11. Also, included in the illustrated network are a companion computer 13, and a companion microphone 12. The ear module 10 can include an environmental mode for listening to sounds in the ambient environment. The network facilitates techniques for providing personalized sound at the ear module 10 from a plurality of companion audio sources such as mobile phones 11, computers 13, and microphones 12, as well as other companion devices such as televisions and radios.

The ear module 10 is adapted to operate in a plurality of modes, corresponding to modes of operating the ear module, such as a Bluetooth® mode earpiece for the phone 11, and the environmental mode. The ear module and the companion devices can execute a number of functions in support of utilization of the ear module in the network.

The ear module 10 includes a voice menu mode in which data indicating a function to be carried out by the ear module or by a companion device, such as a mobile phone 11, is selected in response to user input on the ear module 10. The user input can be for example the pressing of a button on the ear module 10.

In one embodiment described herein, the wireless audio links 14, 15 between the ear module 10 and the linked companion microphone 12, between the ear module 10 and the companion mobile phone 11 respectively, are implemented according to Bluetooth® compliant synchronous connection-oriented SCO channel protocol (See, for example, Specification of the Bluetooth System, Version 4.0, 17 Dec. 2009). Wireless link 16 couples the mobile phone 11 to a network service provider for the mobile phone service. The wireless configuration links 17, 18, 19 between the companion computer 13 and the ear module 10, the mobile phone 11, and the linked companion microphone 12, and optionally the other audio sources are implemented using a control channel, such as a modified version of the Bluetooth® compliant serial port profile SPP protocol or a combination of the control channel and SCO channels. (See, for example, BLUETOOTH SPECIFICATION, SERIAL PORT PROFILE, Version 1.1, Part K:5, 22 Feb. 2001).

Of course, a wide variety of other wireless communication technologies may be applied in alternative embodiments. The mobile phone 11, or other computing platform such as computer 13, preferably has a graphical user interface and includes for example a display and a program that displays a user interface on the display such that the user can select functions of the mobile phone 11 such as call setup and other telephone tasks, which can then be selectively carried out via user input on the ear module 10, as described in more detail below. Alternatively, the user can select the functions of the mobile phone 11 via a keyboard or touch pad suitable for the entry of such information. The mobile phone 11 provides mobile phone functions including call setup, call answering and other basic telephone call management tasks in communication with a service provider on a wireless telephone network or other network. In addition, and as discussed below, mobile phone 11, or other computing platform such as computer 13, can be used to allow the user to generate an audible location alarm for ear module 10. This permits a user to much more easily find a lost or misplaced ear module 10.

The companion microphone 12 consists of small components, such as a battery operated module designed to be worn on a lapel, that house "thin" data processing platforms, and therefore do not have the rich user interface needed to support configuration of private network communications to pair with the ear module 10. For example, thin platforms in this context do not include a keyboard or touch pad practically suitable for the entry of personal identification numbers or other authentication factors, network addresses, and so on. Thus, to establish a private connection pairing with the ear module, the radio is utilized in place of the user interface.

Figure 2:
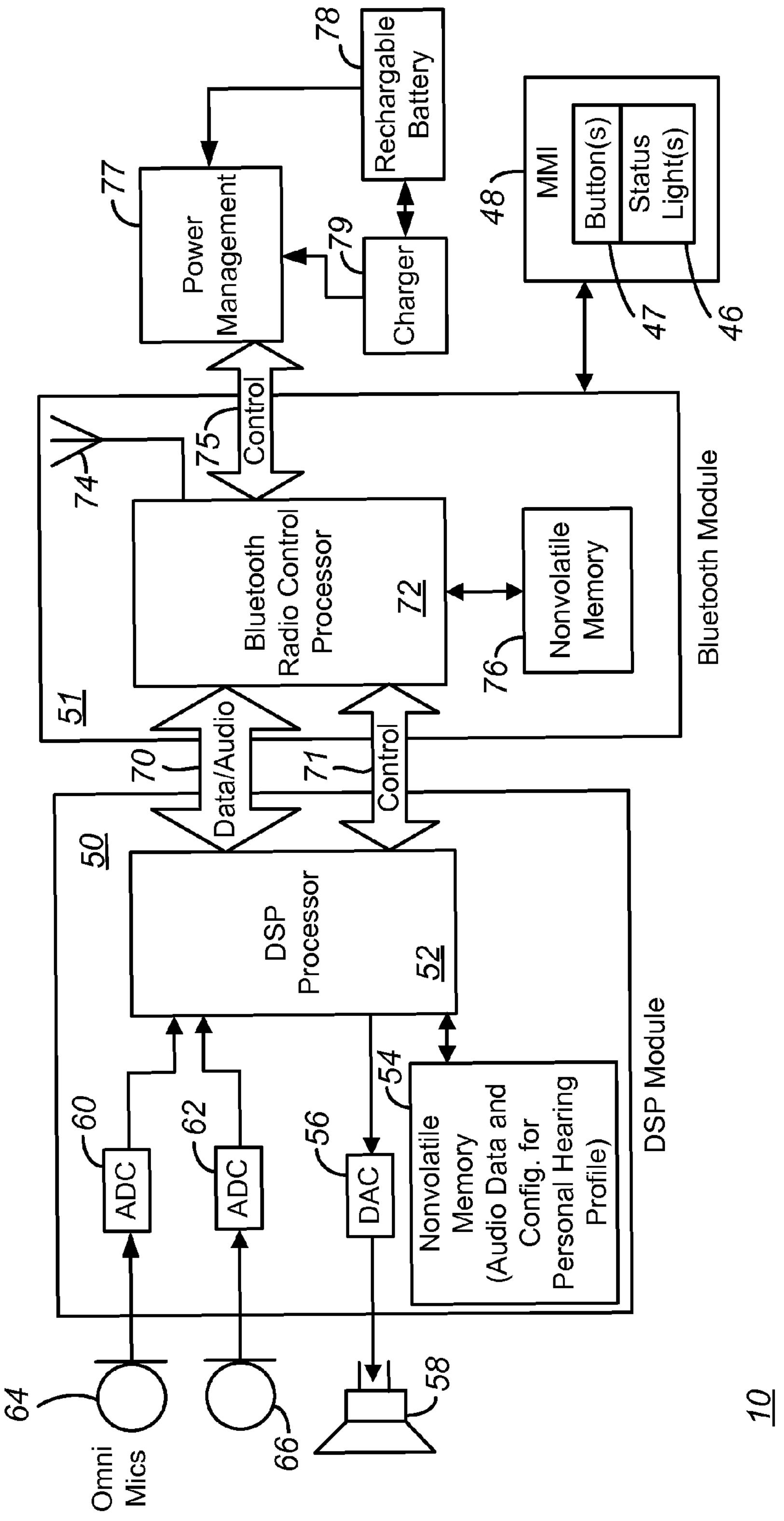
FIG. 2 is a simplified block diagram of circuitry in an ear-level device supporting generating a personalized hearing profile as described herein.

FIG. 2 is a system diagram for microelectronic and audio transducer components of a representative embodiment of the ear module 10. The system includes a data processing module 50 and a radio module 51. The data processing module includes a digital signal processor 52 (hence the reference to "DSP" in some of the Figs.) coupled to nonvolatile memory 54. A digital-to-analog converter 56 converts digital output from the digital signal processor 52 into analog signals for supply to speaker 58 at the tip of the interior lobe of the ear module 10. A first analog-to-digital converter 60 and a second analog-to-digital converter 62 are coupled to two omnidirectional microphones 64 and 66 on the exterior lobe of the ear module. Instead of two omnidirectional microphones, a single microphone or more than two microphones may be used. Other types of microphones, such as unidirectional microphones, can also be used. The microphones can be all the same type or a mixture of types. The analog-to-digital converters 60, 62 supply digital inputs to the digital signal processor 52.

The nonvolatile memory 54 stores audio data associated with various functions that can be carried out by the companion mobile phone. The nonvolatile memory 54 also stores computer programs and configuration data for controlling the ear module 10. These include providing a control program, a configuration file and audio data for the personalized hearing profiles. The programs are executed by the digital signal processor 52 in response to user input on the ear module 10. In addition, the nonvolatile memory 54 stores a data structure for a set of variables used by the computer programs for audio processing, where each mode of operation of the ear module may have one or more separate subsets of the set of variables, referred to as "presets" herein.

The radio module 51 is coupled to the digital signal processor 52 by a data/audio bus 70 and a control bus 71. The radio module 51 includes, in this example, a Bluetooth® radio/baseband/control processor 72. The processor 72 is coupled to an antenna 74 and to nonvolatile memory 76. The nonvolatile memory 76 stores computer programs for operating the radio module 51 and control parameters as known in the art. The nonvolatile memory 76 is adapted to store parameters for establishing radio communication links with companion devices. The processing module 50 also controls the man-machine interface 48 for the ear module 10, including accepting input data from the one or more buttons 47 and providing output data to the one or more status lights 46.

In the illustrated embodiment, the data/audio bus 70 transfers pulse code modulated audio signals between the radio module 51 and the processing module 50. The control bus 71 in the illustrated embodiment comprises a serial bus for connecting universal asynchronous receive/transmit UART ports on the radio module 51 and on a processing module 50 for passing control signals.

A power control bus 75 couples the radio module 51 and the processing module 50 to power management circuitry 77. The power management circuitry 77 provides power to the microelectronic components on the ear module in both the processing module 50 and the radio module 51 using a rechargeable battery 78. A battery charger 79 is coupled to the battery 78 and the power management circuitry 77 for recharging the rechargeable battery 78.

The microelectronics and transducers shown in FIG. 2 are adapted to fit within the ear module 10.

The ear module 10 operates in a plurality of modes, including in the illustrated example, an environmental mode for listening to conversation or other ambient audio, a phone mode supporting a telephone call, an audible location alarm mode whereby a companion device can be used to cause the ear level device to broadcast an increasing volume audible location alarm, and a companion microphone mode for playing audio picked up by the companion microphone which may be worn for example on the lapel of a friend. The environmental mode does not involve a wireless audio connection; the audio signals originate on the ear module 10. The phone mode, the companion microphone mode, and the audible location alarm mode involve audio data transfer using the radio module 51. In the phone mode, audio data is both sent and received through a communication channel between the radio and the phone. In the companion microphone mode, the ear module receives a unidirectional audio data stream from the companion microphone. In the audible location alarm mode, the ear module 10 receives an audible location alarm signal from the companion device.

The control circuitry in the device is adapted to change modes in response to commands exchanged by the radio, and in response to user input, according to priority logic. For example, the system can change from the environmental mode to the phone mode and back to the environmental mode, the system can change from the environmental mode to the companion microphone mode and back to the environmental mode. For example, if the system is operating in environmental mode, a command from the radio which initiates the companion microphone may be received by the system, signaling a change to the companion microphone mode. In this case, the system loads audio processing variables (including preset parameters and configuration indicators) that are associated with the companion microphone mode. Then, the pulse code modulated data from the radio is received in the processor and up-sampled for use by the audio processing system and delivery of audio to the user. At this point, the system is operating in a companion microphone mode. To change out of the companion microphone mode, the system may receive an environmental mode command via the serial interface from the radio. In this case, the processor loads audio processing variables associated with the environmental mode. At this point, the system is again operating in the environmental mode.

If the system is operating in the environmental mode and receives a phone mode command from the control bus via the radio, it loads audio processing variables associated with the phone mode. Then, the processor starts processing the pulse code modulated data for delivery to the audio processing algorithms selected for the phone mode and providing audio to the microphone. The processor also starts processing microphone data for delivery to the radio and transmission to the phone. At this point, the system is operating in the phone mode. When the system receives a environmental mode command, it then loads the environmental audio processing variables and returns to environmental mode.

The control circuitry also includes logic to change to the function selection and control mode in response to user input via the man-machine interface 48.

Figure 3:
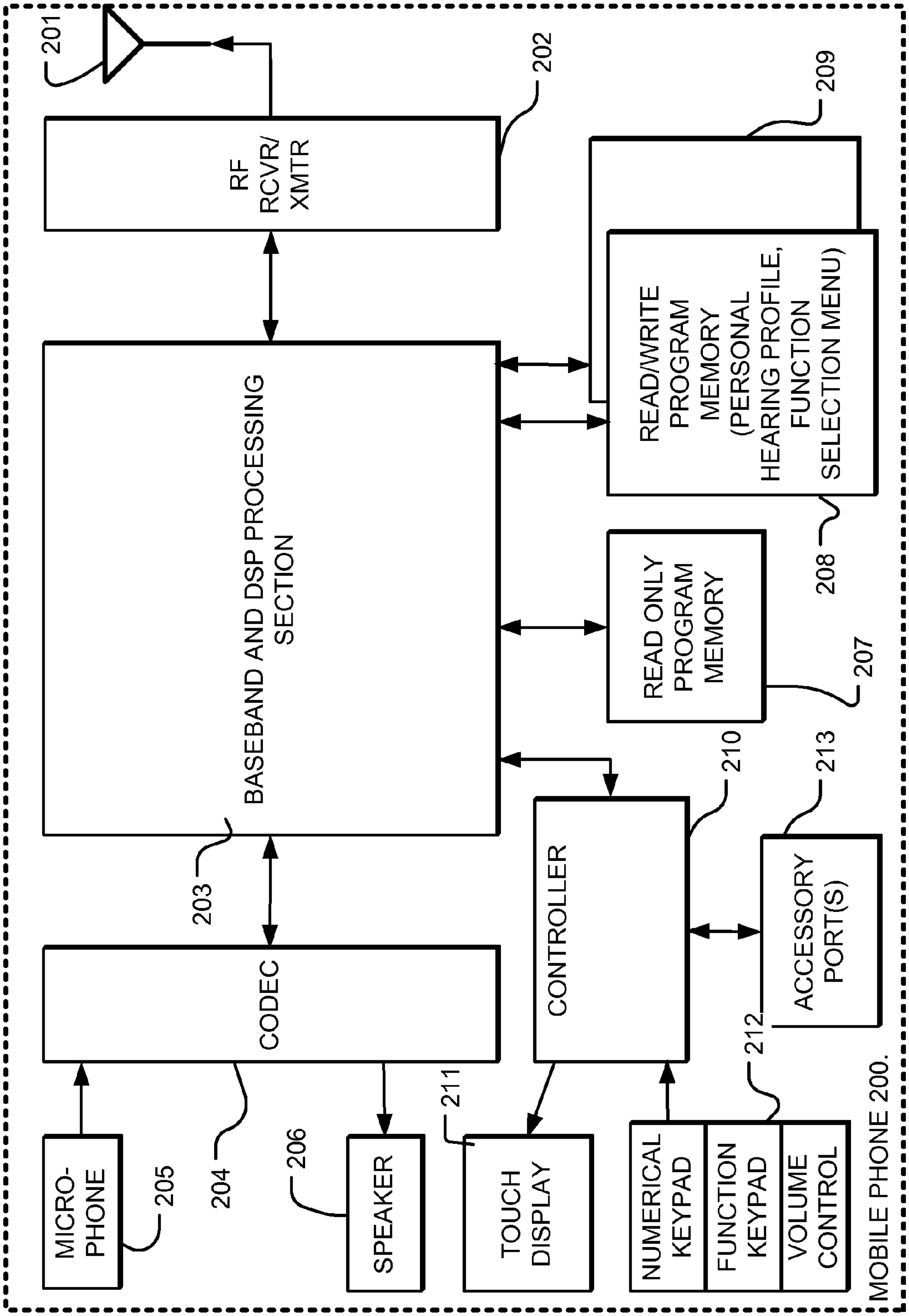
FIG. 3 is a simplified block diagram of circuitry in a mobile phone, operable as a companion device for an ear-level device and supporting the generation of an audible location alarm from the ear-level device as described herein.

FIG. 3 is a simplified diagram of a mobile phone 200, representative of personal communication devices which provide resources for the user to select personal hearing profiles, discussed below. The mobile phone 200 includes an antenna 201 and a radio including a radio frequency RF receiver/transmitter 202, by which the phone 200 is coupled to a wireless communication medium, according to one or more of a variety of protocols. In examples described herein, the RF receiver/transmitter 202 can include one or more radios to support multiprotocol/multiband communications for communication with the wireless service provider of the mobile phone network, as well as the establishment of wireless local radio links using a protocol like Bluetooth® or WIFI protocols. The receiver/transmitter 202 is coupled to baseband and digital signal processor DSP processing section 203, in which the audio signals are processed and call signals are managed. A codec 204, including analog-to-digital and digital-to-analog converters, is coupled to the processing section 203. A microphone 205 and a speaker 206 are coupled to the codec 204.

Read-only program memory 207 stores instructions, parameters and other data for execution by the processing section 203. In addition, a read/write memory 208 in the mobile phone stores instructions, parameters, personal hearing profiles and other data for use by the processing section 203. There may be multiple types of read/write memory on the phone 200, such as nonvolatile read/write memory 208 (flash memory or EEPROM for example) and volatile read/write memory 209 (DRAM or SRAM for example), as shown in FIG. 3. Other embodiments include removable memory modules in which instructions, parameters and other data for use by the processing section 203 are stored.

An input/output controller 210 is coupled to a touch sensitive display 211, to user input devices 212, such as a numerical keypad, a function keypad, and a volume control switch, and to an accessory port (or ports) 213. The accessory port or ports 213 are used for other types of input/output devices, such as binaural and monaural headphones, connections to processing devices such as PDAs, or personal computers, alternative communication channels such as an infrared port or Universal Serial Bus USB port, a portable storage device port, and other things. The controller 210 is coupled to the processing section 203. User input concerning call set up and call management, and concerning use of a personal hearing profile, if any, user preference and environmental noise factors is received via the input devices 212 and optionally via accessories. Hearing profiles are discussed in more detail in co-pending U.S. patent application Ser. No. 12/778,930 entitled Personalized Hearing Profile Generation with Real-Time Feedback, filed on 12 May 2010 and assigned to the same assignee of this application. User interaction is enhanced, and the user is prompted to interact, using the display 211 and optionally other accessories. Input may also be received via the microphone 205 supported by voice recognition programs, and user interaction and prompting may utilize the speaker 206 for various purposes.

In the illustrated embodiment, memory 208 stores a program for displaying a function selection menu user interface on the display 211, such that the user can select the functions to be carried out during the generation of an audible location alarm signal discussed below.

Figure 4:
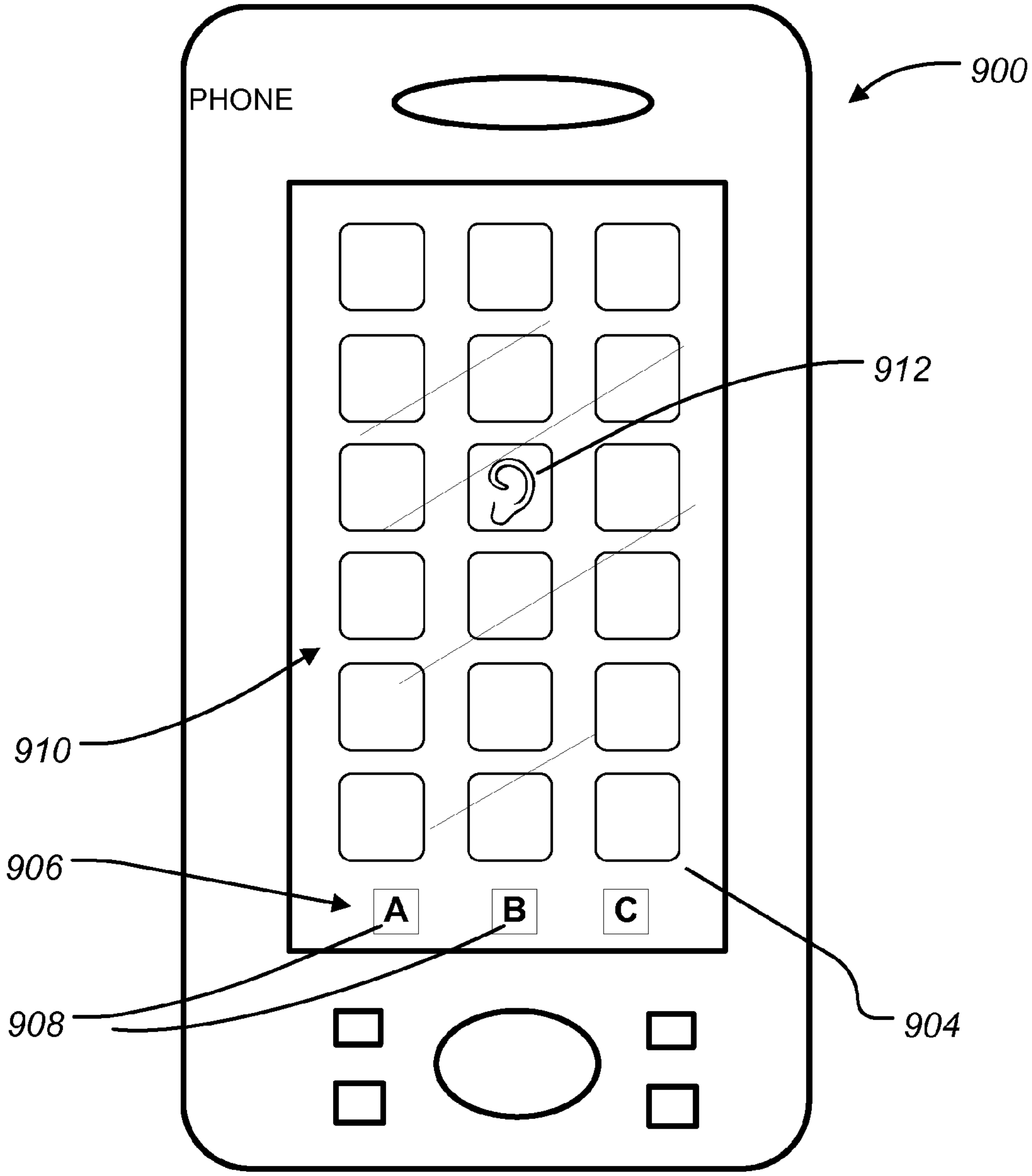
FIG. 4 is a front view of a mobile phone having a touch screen displaying application icons, including an ear module application icon.

The generation of an audible location alarm for ear module 10, used to help find a misplaced or missing ear module 10, will be discussed primarily with reference to FIGS. 1 and 4-9. The communication link 15 between ear module 10 and mobile phone 11, or other companion device including a graphical user interface, will typically be a dual audio and communication link. FIG. 4 illustrates mobile phone 900 having a graphical user interface including a touch screen type of graphic display 904, sometimes referred to as touch screen 904. An example of mobile phone 900 is the iPhone® made by Apple Computer. Touch screen 904 includes a task bar 906 having system icons 908. Application icons 910 are also displayed on touch screen 904 and include an ear-level device application icon 912.

Figure 5:
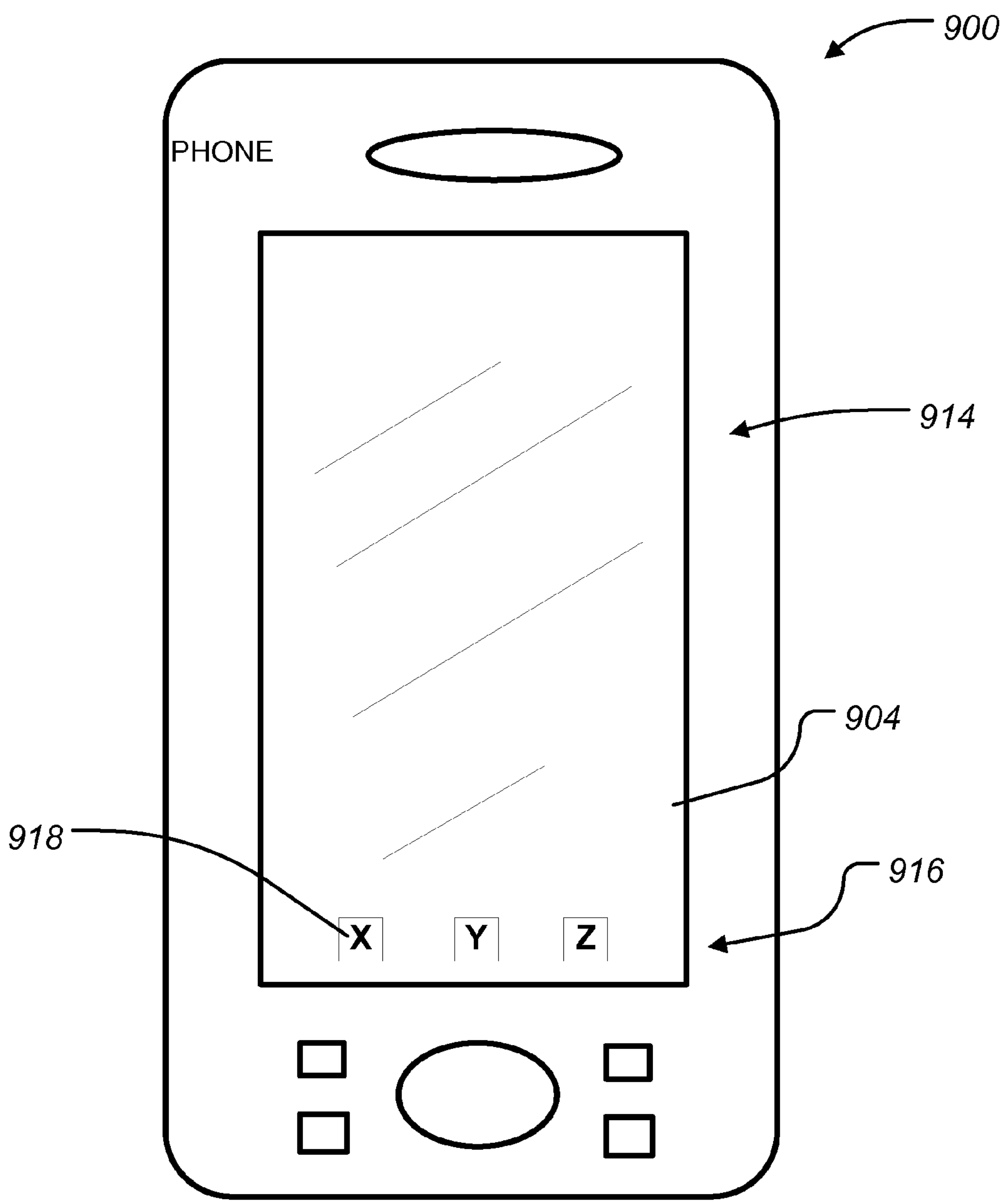
FIG. 5 shows the audible location alarm screen displayed on the touch screen of the mobile phone of FIG. 4 after selecting the ear module application icon.
Figure 6:
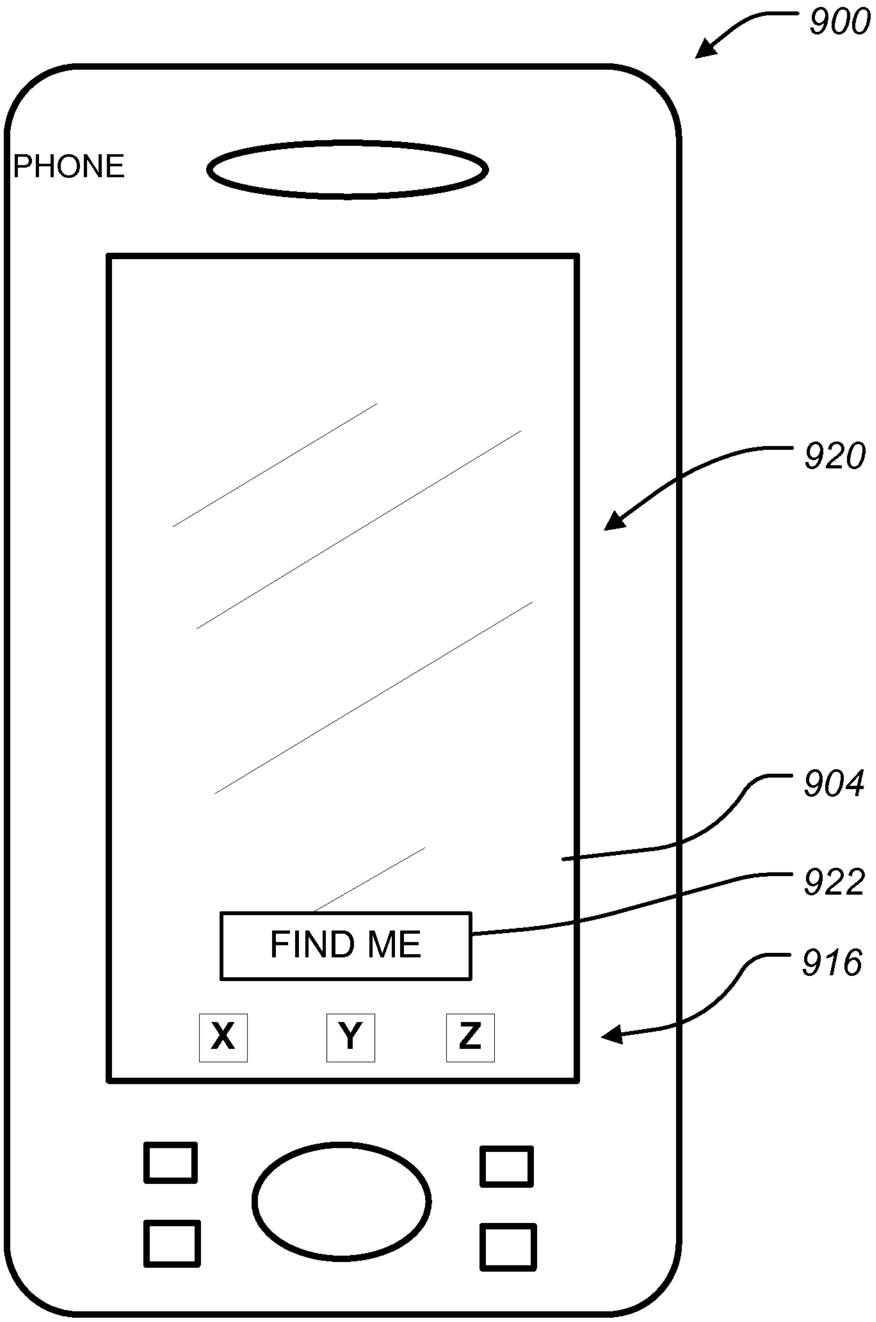
FIG. 6 shows the tools screen which is displayed after selecting the tools icon on the task bar of FIG. 5.
Figure 7:
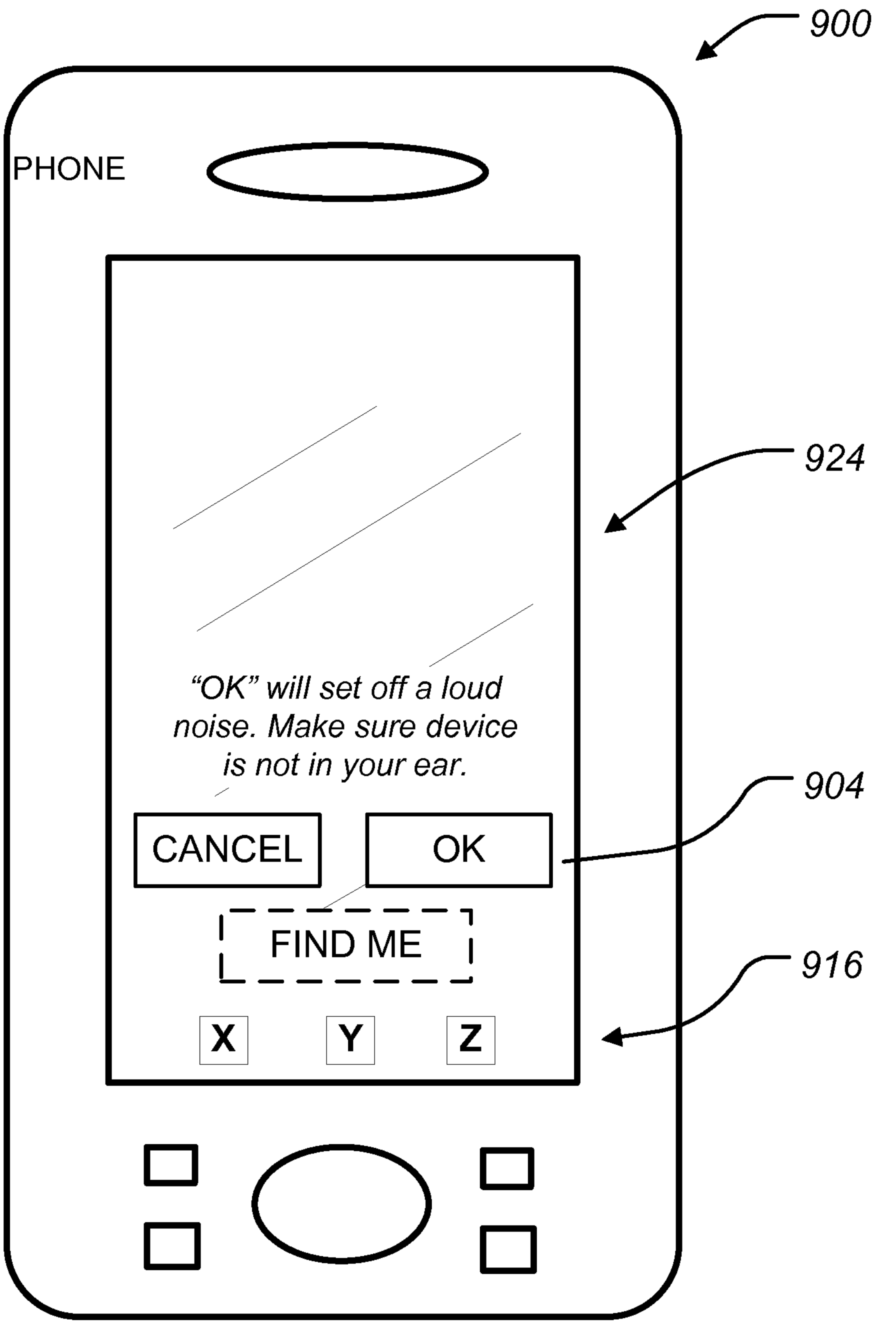
FIG. 7 is a view of the audible alarm warning screen which is displayed after the Find Me icon of FIG. 6 has been selected.

Touching ear-level device application icon 912 causes the audible location alarm program stored in mobile phone 900 to be accessed; the audible location alarm program then displays the audible location alarm screen 914 shown in FIG. 5. Screen 914 includes a task bar 916 having a tools icon 918. Touching tools icon 918 causes the audible location alarm program to display the tools screen 920 shown in FIG. 6. In other examples tools screen 920 can be accessed in other manners, such as directly from touch screen 904 of FIG. 4. Tools screen 920 displays several different tool icons, only one of which is shown in FIG. 6, that is audible location alarm icon 922, also referred to as Find Me icon 922. Touching Find Me icon 922 causes touch screen 904 display an audible alarm warning screen 924 shown in FIG. 7. Screen 924 provides user with a clear warning not to proceed with activation of the audible alarm if the ear module 10 is at or near the ear. One such warning is as follows: ""OK" will set off a loud noise. Make sure devices not in your ear." Screen 924 also has two touch sensitive buttons labeled Cancel and OK. Touching Cancel returns the user to screen 920 of FIG. 6. Touching OK causes the audible location alarm program to generate an audible location alarm signal which is then transmitted by mobile phone 900 to ear module 10. In some examples an additional warning screen, not shown, is generated by the audible location alarm program to require the user to again indicate the desire to proceed with the alarm. Upon receipt of the audible location alarm signal, ear module 10 then broadcasts a relatively loud, audible location alarm to help the user locate the missing or misplaced ear module 10.

Figure 8:
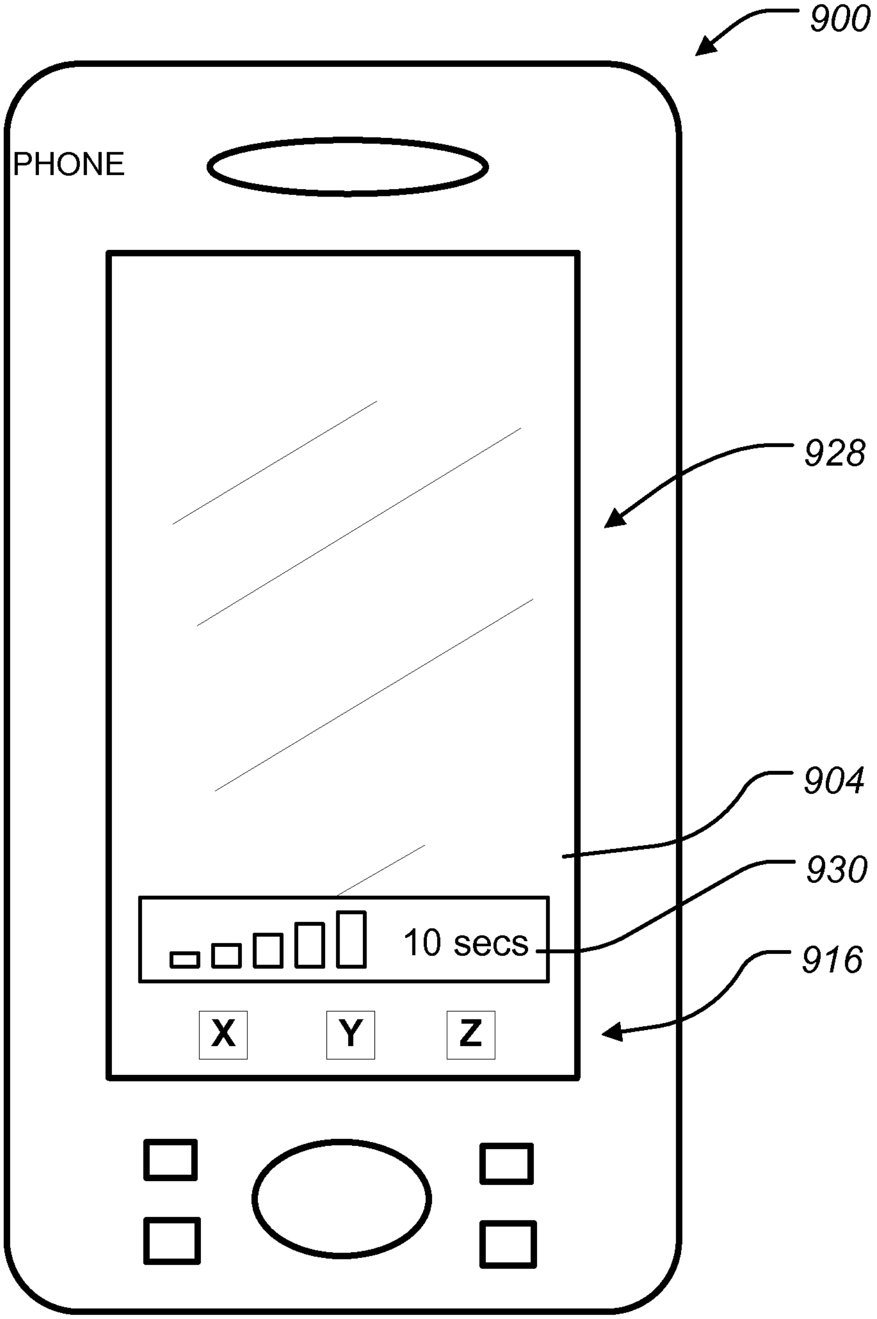
FIG. 8 shows the progress indicator screen displayed once the audible location alarm program has transmitted an audible location alarm signal to the ear module.
Figure 9:
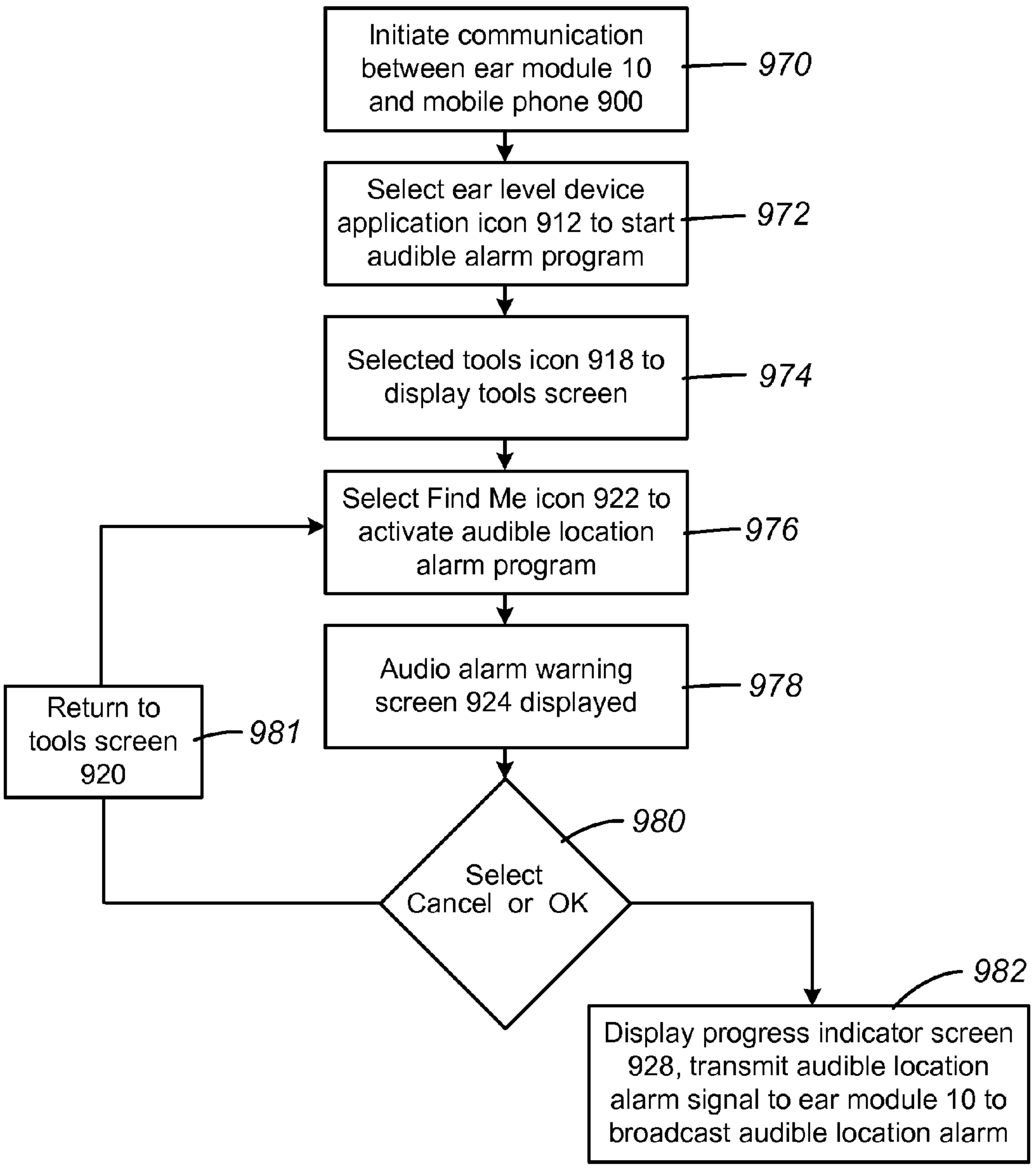
FIG. 9 is a simplified flowchart showing basic steps for one example of the invention for generating an audible location alarm.

In some examples the location alarm broadcast by the ear module is a constant-volume alarm. In addition, the screen 924 could include an option for a fixed volume audible location alarm and one or more variable volume audible location alarms. In the example described below, the audible location alarm signal is such that it causes the audible location alarm broadcast by the ear module to increase in volume over time. This increase in volume can take a number of forms, including a straight-line, continuous increase in volume over time, a stepwise increase in volume over time, a curved-line, continuous increase in volume over time, or a combination thereof. There also may be one or more decreases in volume over time; such decreases will typically be relatively short. FIG. 8 illustrates a progress indicator screen 928 which is displayed at the beginning of the generation of the audible location alarm broadcast by ear module 10. In the illustrated example of FIG. 8 a progress indicator 930 shows that the alarm is broadcast for 10 seconds with a linear increase in volume. In some examples progress indicator screen 928 can include a cancel button, not shown, which would allow the user to terminate the alarm being generated by ear module 10 before the alarm has sounded for its complete cycle.

In this example the audible location alarm signal is broadcast over a period of time by providing the input to ear module 10 with instructions to ear module on how the alarm should sound (which may be constant or may change) and how loud it should be. In some examples the audible location alarm signal can be a single broadcast signal which initiates the generation of the audible location alarm broadcast by your module 10 with the ear module being programmed to create the increase in volume over time. In some examples the user may be given the option to choose different attributes for the audible location alarm, such as the total length, the maximum volume, and the type of alarm signal such as constant tone or varying tone. Other alternatives also contemplated.

Generating an audible location alarm for an ear-level device, such as ear module 10, can be carried out as follows. Communication between ear module 10 and a companion device, such as mobile phone 900, is initiated. See 970 in FIG. 9. The communication is typically wireless but it can be wired. The initiation of the audible location alarm program, see 972, is typically carried out by the user selecting ear-level device application icon 912 on the graphic display 904 of mobile phone 900. Doing so opens up the audible location alarm screen 914 of FIG. 5. Tools icon 918 is then selected causing tools screen 920 of FIG. 6 to be displayed. See 974 in FIG. 9. The user then selects the audible location alarm icon (find me icon) 922 (see 976) which causes the audible location alarm program stored in mobile phone 900 to become active. The program then causes the display of audio alarm warning screen 924 of FIG. 7. See 978 in FIG. 9. The user then selects Cancel or OK. See 980 in FIG. 9. If the user selects Cancel, the audible location alarm program then causes mobile phone 900 to return to and display the tools screen 920 of FIG. 6. See 981 in FIG. 9. If the user selects OK, see 982, the audible location alarm program causes the display of progress indicator screen 928 and begins transmitting an audible location alarm signal to ear module 10 for a length of time, such as 10 seconds, causing ear module 10 to broadcast an audible location alarm which increases in volume over time.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

Any and all patents, patent applications and printed publication referred to above are incorporated by reference for all purposes.

What is claimed is:

1. A method for locating an ear-level device by generating an audible location alarm from an ear-level device of a type comprising a memory, a microphone and a speaker, each coupled to a processor, the method comprising:

establishing communication between the ear-level device and a companion device, the companion device comprising a user interface, a display associated with the user interface, and an audible location alarm program stored in the companion device;

initiating, in response to an input signal from a user, the audible location alarm program at the companion device;

displaying, following the initiating step, a symbol on the display indicating transmission of audible location alarm signal to the ear-level device;

accepting an input signal at the companion device indicating whether to cancel the audible location alarm; and the audible location alarm program causing transmission of an audible location alarm signal from the companion device to the ear-level device, thereby providing instruction to the ear-level device to cancel the-audible location alarm through the speaker of the ear level device.

2. The method according to claim 1, wherein the communication establishing step is carried out with a mobile phone as the companion device.

3. The method according to claim 1, wherein the communication establishing step is carried out with a chosen one of a digital music player or a computer as the companion device.

4. The method according to claim 1, further comprising transmitting audio data from the companion device to the ear-level device for broadcast by the ear level device.

5. The method according to claim 1, wherein the communication between the ear level device and the companion device is carried out by wireless communication.

6. The method according to claim 1, wherein the audible location alarm program initiating step comprises the user touching a touch screen type of display of the companion device.

7. A method for locating an ear-level device by generating an audible location alarm from an ear-level device of a type comprising a memory, a microphone and a speaker, each coupled to a processor, the method comprising:

establishing communication between the ear-level device and a companion device, the companion device comprising a user interface, a display associated with the user interface, and an audible location alarm program stored in the companion device;

initiating, in response to an input signal from a user, the audible location alarm program at the companion device;

providing on the display an audible location alarm cancel identifier and an audible location alarm proceed identifier, and in response to a signal indicating selection of the audible location alarm cancel identifier:

at least temporarily preventing performance of the audible location alarm signal transmitting step; or causing the audible alarm location alarm program to re-transmit or continue transmission of the audible location alarm signal from the companion device to the ear-level device, thereby providing instruction to the ear-level device to broadcast an audible location alarm through the speaker of the ear level device.

8. The method according to claim 7, wherein the audible location alarm program causes transmission of increasing volume audible location alarm signal so that the audible location alarm broadcast by the ear-level device increases in volume over time.

9. The method according to claim 7, wherein the audible location alarm program causes transmission of an incrementally variable volume audible location alarm signal so that the audible location alarm broadcast by the ear-level device incrementally increases in volume in a stepwise fashion.

10. The method according to claim 7, wherein the audible location alarm program causes transmission of an increasing volume audible location alarm signal so that the audible location alarm broadcast by the ear-level device has a continuous increase in volume over time.

11. The method according to claim 7, wherein the audible location alarm program causes transmission of a constant volume audible location alarm signal so that the volume of the audible location alarm broadcast by the ear-level device remains generally constant over time.

12. The method according to claim 7, wherein the communication establishing step is carried out with a mobile phone as the companion device.

13. The method according to claim 7, wherein the communication establishing step is carried out with a chosen one of a digital music player or a computer as the companion device.

14. The method according to claim 7, further comprising transmitting audio data from the companion device to the ear-level device for broadcast by the ear level device.

15. The method according to claim 7, wherein the communication between the ear level device and the companion device is carried out by wireless communication.

16. The method according to claim 7, wherein the audible location alarm program initiating step comprises the user touching a touch screen type of display of the companion device.

17. A method for locating an ear-level device by generating an audible location alarm from an ear-level device of a type comprising a memory, a microphone and a speaker, each coupled to a processor, the method comprising:

establishing communication between the ear-level device and a companion device, the companion device comprising a user interface, a display associated with the user interface, and an audible location alarm program stored in the companion device;

initiating, in response to an input signal at the companion device, the audible location alarm program by selecting a first, ear-level device application icon on the display causing the audible location alarm screen to be displayed on the display;

selecting a second, tools icon causing a tools screen to be displayed on the display;

selecting a third, find me icon causing the audible location alarm program to become active and the display of an audio alarm warning screen on the display;

selecting a cancel icon or a proceed icon;

if the cancel icon is selected, return to the second, tools icon selecting step; and if the proceed icon is selected, transmitting an audible location alarm signal from the companion device to the ear-level device for a length of time, thereby providing instruction to the ear-level device to broadcast an audible location alarm through the speaker of the ear level device.

18. The method according to claim 17, wherein the audible location alarm signal transmitting step comprises transmitting an increasing volume audible location alarm signal so that the audible location alarm broadcast by the ear-level device increases in volume over time.

* * * * *